Jan. 31, 1956   B. H. CARLISLE   2,733,393
DYNAMIC BRAKING HOIST CONTROL
Filed May 26, 1953
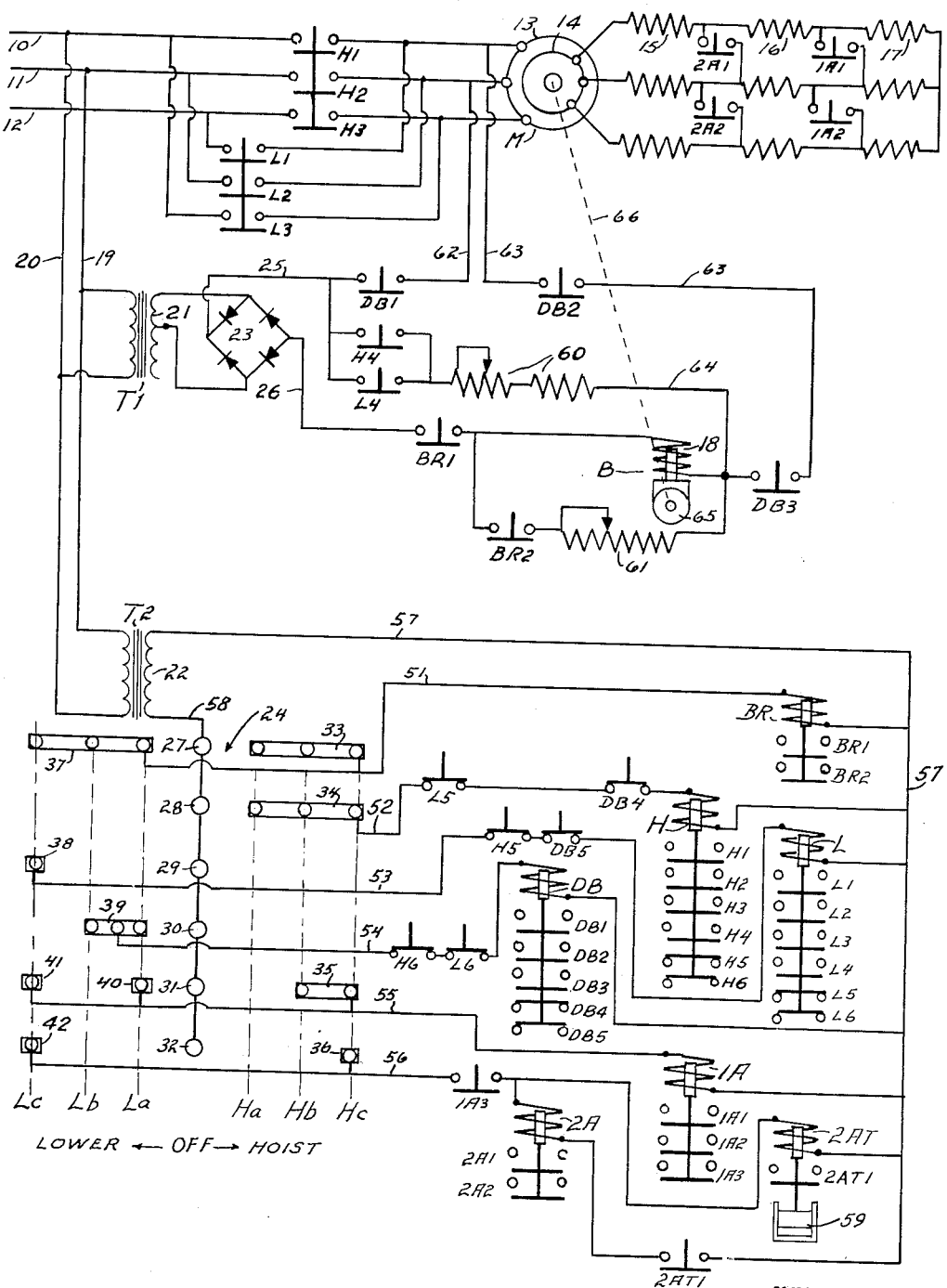
INVENTOR.
Benjamin H. Carlisle
BY
Harry R. Canfield

United States Patent Office 2,733,393
Patented Jan. 31, 1956

2,733,393
DYNAMIC BRAKING HOIST CONTROL

Benjamin H. Carlisle, South Euclid, Ohio, assignor to The Clark Controller Company, Cleveland, Ohio, a corporation of Ohio Application May 26, 1953, Serial No. 357,561

3 Claims. (Cl. 318—203)

This invention relates to electric hoists and controls therefor.

There is a general class of electric hoists in which an induction motor, having a rotor with adjustable external resistance, has its stator energized with alternating current to drive a hoist cable drum in the load raising direction and which lowers the load with dynamic braking, by having its stator energization changed over from alternating current to direct current.

A mechanically set electrically-released friction brake is also provided for such hoists to bring the load to rest and hold it; and hoisting and lowering circuits and connections for the motor and brake are made by a controller, usually operated manually.

The present invention is a hoist and control of this general class, and the primary object of the invention is to provide such a hoist and control having features of improvement and an improved mode of operation.

In the preferred embodiment of the invention, the circuits and connections for hoisting and lowering, are made by electromagnetic contactors, operated and restored by a master controller controlling energization of their windings; and a complete embodiment of that type of control is described hereinafter; but it is to be understood that the circuits and connections may be made and broken directly upon movable contacts of the master controller itself, and those skilled in the art will understood how to embody the invention in a control of that type, from the description of the preferred embodiment hereinafter.

According to the invention, the master controller has a number of hoist positions or "points"; a number of lowering points; and an intermediate "off" point; and, when moved to these points, actuates contactors with the following effect.

Electric power is supplied by polyphase supply lines, preferably three phase.

On each of the hoist points, a main hoist-contactor is closed and connects the stator of the motor to the A. C. lines, so phased as to drive the motor in the hoisting direction, and, on different ones of the hoist points, contactors cut sections of the rotor resistance in or out to vary the speed of hoisting by well known principles.

There is also a main lowering-contactor that closes, on a lowering point to be referred to, and connects the stator to the A. C. lines, so phased as to drive the motor by power in the lowering direction.

The winding of the electromagnetic brake is energized to release the brake, by direct current, supplied by a rectifier connected to the A. C. lines, preferably through a step-down transformer. The circuit of the brake winding is completed through control contacts on the main hoist-contactor or on the main lowering contactor when either of them is closed. Both main contactors are opened on the off point; and the brake is deenergized and sets on the off point.

Upon moving the master controller from the off point and over successive lowering points, both main contactors remain open, and A. C. is thereby cut off from the motor stator and a circuit is made from the rectifier through the brake winding, and through the stator winding in series and back to the rectifier; thus energizing the stator and brake with direct current; and releasing the brake.

Lowering of the hoist load then takes place by dynamic braking, by well known principles, and the aforesaid contactors cut in or out sections of the rotor resistance on different ones of the dynamic braking lowering points to vary the braking effect and the speed of lowering.

On a lowering point, remote from the off point, direct current energization of the stator is interrupted, and the main lowering contactor is closed, giving A. C. to the stator in the direction to drive the load down, thus providing a high speed lowering point.

As mentioned, the brake is energized by D. C. in the stator during dynamic braking lowering; and is energized by D. C. through control contacts on the main lowering contactor when it closes to give A. C. to the stator for power lowering; but the main lowering contactor cannot close and give A. C. to the stator until after the D. C. to the stator has been interrupted; so that during the period of transition from D. C. stator to A. C. stator energization, the brake winding (in the absence of countervailing provisions) would first be denergized and set the brake and then after the transition was made would be energized and release the brake.

Such momentary on-and-off action of the brake would introduce an undesirable irregularity and jerking effect in the lowering movement of the load and offset the advantages of energizing the brake in the manner described, and accordingly the invention comprises means to prevent it, as follows.

A resistor is connected in parallel with the brake winding. When energization of the brake winding is momentarily interrupted, as aforesaid, the winding discharges inductively through the resistor, which in effect is then in a closed loop in series with the winding, and the discharge maintains current in the loop sufficient to hold the brake released during the said period of transition.

A contactor in the loop between the resistor and the brake winding is opened on the off point, so that on the off point the brake sets without delay.

During D. C. stator energization, the resistance of the stator winding is in series with the brake winding as aforesaid; but when the transition is made to A. C. stator energization, this resistance is absent.

In order that the current in the brake winding may be of substantially the same value both for D. C. stator and A. C. stator energization to avoid irregularities in brake action and other objectionable results, a resistor is arranged so that it substitutes for the resistance of the D. C. stator winding when the transition is made from D. C. stator to A. C. stator energization.

From the foregoing, it will be seen that a part of the invention resides in the energization of the brake winding with direct current, with the attendant advantages thereof, and in the manner in which its energization and release is made certain to occur only when the stator is energized, and in the manner in which uniform continuous energization is correlated to stator energization in going from a dynamic brake lowering point to a power lowering point; and it will be apparent that the same improved manner of energization will occur when going in the other direction from the power lowering point to the dynamic braking lowering point.

Besides the primary object of the invention referred to, other objects are to provide a hoist and control having the features and mode of operation set forth above. The actual invention is set forth in the claims.

The invention is fully disclosed in the following description taken in connection with the accompanying drawing in which, the single figure of the drawing is a diagrammatic view of a preferred embodiment of the invention showing in the upper part the circuits and contacts for the motor and brake; and in the lower part the master controller and the contactors operated thereby.

Referring to the drawing there are shown at 10—11—12 three phase alternating current supply mains for supplying current to the stator 13 of an induction hoist motor M; having a three phase wound rotor 14 connected to three phase external resistance in three sections, 15—16—17. The resistance sections may all be in circuit with the rotor 14; or section 17 may be cut out upon closure of contacts 1A—1A2, and sections 17—16 cut out upon closure of contacts 2A1—2A2 to be referred to. The motor rotor is connected to a hoist cable drum not shown.

Main line contacts H1—H2—H3 when closed energize the motor for hoisting; and main line contacts L1—L2—L3 reverse the line phases to energize it to drive it in the lowering direction; these contacts to be further described.

At B is a mechanically set brake for braking the motor rotor 14, having a brake drum 65 connected to the rotor as indicated by the dotted line 66, and a brake releasing winding 18.

Wires 19—20 connected across two of the A. C. mains, 10—11, energize the primaries of transformers T1 and T2.

The secondary 22 of transformer T2, supplies A. C. current from its lower terminal by wire 58 to a master controller 24 and through it to various magnetic contactors controlled by it, to be described, the return circuit from the contactors to the upper terminal of the secondary 22 being by control main 57.

The secondary 21 of transformer T1, supplies A. C. to a polygonal rectifier 23, having D. C. output mains 25—26, which supply D. C. to the brake winding 18, and to lines 62—63 for energizing the motor stator 13 with D. C. for dynamic braking, in a manner to be described.

The master controller 24 may be of well known construction, and in the diagrammatic showing comprises contacts 27 to 32, all connected together, and shown in an "off" position, and movable in unison toward the right to successive hoist points, Ha, Hb, Hc and toward the left to successive lowering points La, Lb, Lc, to engage, variously, stationary contacts 33 to 42 connected to control lines 51 to 56.

The lines 51 to 56 are arranged in an across-the-line type of diagram, all going at their right ends to the control main 57, connected to the upper terminal of the secondary 22. Thus any movable contact 27 to 32 upon engagement with any stationary contact 33 to 42, energizes one or another of the lines 51 to 56.

Electromagnetic contactors having windings in the lines 51 to 56, are provided as follows:

Contactor BR having two normally open contacts BR1, BR2.

Contactor H having four normally open contacts H1, H2, H3, H4 and two normally closed contacts H5, H6.

Contactor L having four normally open contacts L1, L2, L3, L4, and two normally closed contacts L5, L6.

Contactor DB having three normally open contacts DB1, DB2, DB3 and two normally closed contacts DB4, DB5.

Contactor 1A having three normally open contacts 1A1, 1A2, 1A3.

Contactor 2A having two normally open contacts 2A1, 2A2.

Contactor 2AT having normally open contact 2AT1 and a delayed operation timing device 59 shown diagrammatically as a dash-pot, but which may be of any type that delays operation of the contactor after it is energized.

To avoid complexity of the diagram, the contacts of each contactor are shown on the contactor without connections thereto; and the contacts are reproduced elsewhere in the diagram, with the connections thereto.

At 60, 61 are resistors, indicated as adjustable.

Parts not thus far described including interconnecting conductors will be described in connection with a description of the general operation which follows.

*Off point*

On the Off point of the master 24, all contactors are restored; the D. C. rectifier supply lines 25—26 for the brake winding 18 are open at the contacts BR1, H4 and L4; and DB1, DB2 and DB3, as illustrated, and the brake winding 18 is deenergized and the brake B sets.

*Hoist points*

On moving the master 24 to any of the hoist points Ha, Hb, Hc, line 51 will be energized; contactor BR will operate closing contacts BR1 and BR2; and line 52 will be energized, operating contactor H to close contacts H1 to H4 and open contacts H5, H6.

The D. C. rectifier lines 25—26 are then closed through contacts BR1, brake winding 18, line 64, resistor 60, and contacts H4, and the brake B is released.

Contactor H cannot operate at this time if main line contactor L is in unintended operated condition, or if the stator D. C. control lines 62—63 should be closed by unintended operated condition of contactor DB to be described, because then contacts L5 and DB4 in master line 52 would be open; thus giving protective interlock.

On hoist point Ha, closing of contactor H closes line contacts H1, H2, H3, and gives three phase main line current to the sttaor of motor M and it runs in the hoisting direction at reduced speed with all of the resistance 15—16—17 in its rotor circuit.

On going to hoist point Hb, master line 55 is energized, and contactor 1A is operated, closing contacts 1A1—1A2 and 1A3. Contacts 1A1 and 1A2 cut out motor rotor resistance sections 17, and hoisting speed is increased.

On going to hoist point Hc, master line 55 is kept energized keeping main contacts 1A1, 1A2 and control contact 1A3 closed. Master line 56 is also energized through now closed contacts 1A3 as a protective interlock, and contactor 2AT operates with delay, finally closing contacts 2AT1. Upon closure of contacts 2AT1, contactor 2A operates closing contacts 2A1 and 2A2, cutting out all of the resistance sections except section 15, and the motor runs at maximum hoist speed.

Upon going back to hoisting point Hb, line 56 will be deenergized, contactor 2A will be deenergized and will restore, and contactor 1A remain operated; and upon going back to point Ha, line 55 will be deenergized and contactor 1A restored; thus introducing resistance sections 16, or 16 and 17, for lower hoisting speeds.

*Lowering points*

On moving the master to the first or second lowering points La, Lb, the master lines 51 and 54 are energized. Energization of line 54 operates contactor DB closing contacts DB1 to DB3 and opening contacts DB4, DB5; and energization of line 51 operates contactor BR and closes contacts BR1, BR2. The rectifier output lines 25—26 supply D. C. through contacts DB1, line 62, the stator winding 13, contacts DB2, DB3, and brake winding 18 and contacts BR1; giving D. C. to the motor stator 13 and releasing the brake. This cannot occur if either line contactors L or H is in unintended operated condition, because normally closed contacts L6 and H6 are in master line 54 and would be open; nor can it occur unless contacts BR1 are closed which keep the brake released, since the brake winding 18 and stator D. C. winding 13 are in series as is apparent; thus providing protective interlock and insuring that the A. C. power must be cut off from the stator before the D. C. is applied.

With A. C. off of the stator and D. C. on it, the load lowers with dynamic braking of the rotor 14 by well known principles.

On the first lowering point La, the master line 55 is also energized, operating contactor 1A, closing contacts 1A1—1A2 and 1A3. Contacts 1A1—1A2 cut out section 17 of the rotor resistance, leaving sections 15—16 both cut in and giving a slow lowering speed.

On the second lowering point, L*b*, the master line 55 is deenergized, restoring contactor 1A and by opening contacts 1A1 and 1A2, cutting in all resistor sections 15, 16 and 17, giving a higher lowering speed.

On going to the third lowering point L*c*, from second point L*b*, a different type of lowering control occurs.

Master line 51 is kept energized keeping contacts BR1 and BR2 closed. Line 54 is deenergized, restoring contactor DB which by opening contacts DB1, DB2, DB3, cuts off D. C. from the stator 13. Also master lines 53, 55 and 56 are energized operating contactors L, 1A and 2A and their contacts as described.

Contactor L is energized by line 53 and by closing main line contacts L1, L2, L3 applies A. C. to the stator 13 in the reverse direction, that is, to drive the rotor 14 in the lowering direction. This cannot occur however until after contactor DB has restored as aforesaid and by opening its contacts DB1, DB2, DB3 has cut off D. C. from the stator, because its contacts DB5 are in the master line 53 and are open; neither can it occur if the line contactor H should be in unintended operated condition because its contacts H5 are also in the master line 53 and are open; thus providing protective interlock, and insuring that the stator D. C. is cut off before the stator A. C. is cut in.

Upon energizing lines 55 and 56, contactors 1A and 2A operate and their contacts close and cut out rotor resistance sections 16 and 17 as described leaving section 15 cut in thus insuring a high lowering speed.

Near the end of the lowering descent, the master can be moved back to lower point L*b* or L*c* to restore dynamic braking as before, and reduce the lowering speed; or moved to off point to set the brake and stop the descent.

On going to lowering point L*c*, the brake winding 18 is no longer energized in series with the stator 13, contacts DB1, DB2, and DB3 being open, as aforesaid; but is energized through contacts L4 on the line contactor L, and through resistor 60; and therefore will not be energized at all and the brake will set, if for any reason line contactor L failed to operate, after the D. C. was cut off from the stator.

For various reasons one of which will be emphasized below, it is desirable to have the brake winding current of approximately the same value after the transition from D. C. to A. C. on the stator as it was before; and it is for this reason that the resistor 60 is cut into the line 64 of the brake winding circuit when the transition is made.

The resistance of the resistor 60 is thus substituted for that of the stator. The resistor 60 furthermore, and to the same end, is made adjustable to adapt it to different motors that might have stators of different resistance values.

When, as aforesaid, on leaving point L*b*, and restoring contactor DB to cut off D. C. from the stator, and before arriving at point L*c* and operating contactor L to put A. C. on the stator, there is a short period in which the brake winding 18 is not energized, since both alternative paths for the brake current through contacts DB3 or L4 (as well as H4) will be open. During this period the brake, usually quick acting, will set (in the absence of any countervailing action). Upon reaching point L*c*, and closing contact L4, the brake will again be energized and released as described; resulting in an on-and-off action of the brake. Such on-and-off action will occur in going back from point L*c* to point L*b* as will be understood. This would be undesirable, resulting in irregular jerky lowering and excessive wear on the brake as well as possible shock damage.

To obviate this, the resistor 61 is bridged across the brake winding 18.

The energizing current to the winding 18 is always D. C. as explained.

When the energizing current is cut off, during the aid transition, the resistor 61 is then in effect in a closed loop in series with the brake winding 18. Being inductive its stored magnetic energy, upon decaying, generates maintaining potential on the winding that keeps it energized sufficiently to hold the brake released for the duration of the transition period, after which, full energization is resumed.

This "hold over" action will be facilitated, both in going from point L*b* to point L*c*, and from point L*c* to point L*b* as explained, if the energizing current in the winding is always of approximately the same value in each case; and it is primarily to this end that the resistor 60 is adjustable to be substantially equal to that of the D. C. stator circuit. Also, by such equality of currents, the rectifier 23 may be of minimum size and not subjected to widely varying demand.

The resistor 61 is itself made adjustable in correspondence with the optimum resistance found for the resistor 60.

When the master is brought to off point, it is desired to have the brake set instantly without any delaying effect by the resistor 61. To this end the contacts BR2 are placed in the said loop, in series with the resistor 61, and opened on the off position by de-energizing master line 51 and restoring of contactor BR as described.

The invention is not limited to all of the details nor to the exact arrangement thereof shown and described and the invention comprehends all changes and modifications thereof that come within the scope of the appended claims.

For example, the contacts DB3 of contactor DB may be omitted. When used as shown in series with contacts DB2 they insure quicker interruption of the stator D. C. circuit which because of being inductive tends to be sustained by arcing at the interrupting contacts.

I claim:

1. In a motor control for an A. C. induction hoist motor having a stator winding and a rotor; an electromagnetic rotor brake having a winding to release it; a source of A. C.; a source of D. C.; selectively operable hoisting and lowering contactors having main contacts closable thereby to connect the stator to the A. C. supply to effect, selectively, power hoisting or power lowering by the rotor; the lowering and hoisting contactors having respectively auxiliary contacts closed thereby concurrently with the main contacts; a circuit from the D. C. source through the brake winding and through a resistance in series therewith and through closed auxiliary contacts on either selectively operated contactor to release the brake; dynamic braking contactors having contacts closed upon operation thereof and closing a circuit from the D. C. source through the stator winding and brake winding in series to energize them and release the brake; means interlocking operation of the said hoisting and lowering contactors with operation of the dynamic braking contactors to insure opening of the main and auxiliary contacts of the hoisting and lowering contactors before closing of the dynamic braking contacts; whereby the said resistance is excluded from the D. C. circuit of the stator; the D. C. energization of the stator effecting dynamic braking of the rotor on lowering; the said resistance being adjustable and substantially equal to the resistance of the D. C. energized stator circuit, to cause the brake releasing current to be of the same amperage when released for power operation as when released for dynamic brake operation.

2. In a motor control for an A. C. induction hoist motor having a stator winding and a rotor; an electromagnetic rotor brake having a winding to release it; a source of A. C.; a source of D. C.; selectively operable hoisting and lowering contactors having main contacts closable thereby to connect the stator to the A. C. supply to effect, selectively, power hoisting or power lowering by the rotor; the lowering and hoisting contactors having respectively auxiliary contacts closed thereby concurrently with the main contacts; a circuit from the D. C. source through the brake winding and through a resistance in series therewith and through closed auxiliary contacts on either selectively operated contactor to release the brake;

dynamic braking contactors having contacts closed upon operation thereof and closing a circuit from the D. C. source through the stator winding and brake winding in series to energize them and release the brake; means interlocking operation of the said hoisting and lowering contactors with operation of the dynamic braking contactors to insure opening of the main and auxiliary contacts of the hoisting and lowering contactors a short interval of time before closing of the dynamic braking contacts; whereby the said resistance is excluded from the D. C. circuit of the stator; and whereby the brake winding is disconnected from said D. C. source during said interval; a resistor connected across the brake winding to maintain it energized by winding discharge during said interval; the D. C. energization of the stator effecting dynamic braking of the rotor on lowering; the said resistance being adjustable and substantially equal to the resistance of the D. C. energized stator circuit, to cause the brake releasing current to be of the same amperage when released for power operation as when released for dynamic brake operation.

3. In a motor control for an A. C. hoist induction motor having a stator winding and a rotor; a rotor brake having a winding to release it, a source of A. C.; a source of D. C.; a pair of contactors operable selectively to connect the A. C. supply to the stator winding for power hoisting or lowering selectively, and concurrently to connect the brake winding and a resistor in series to the D. C. source to release the brake; dynamic braking contactors operable to connect the stator winding and the brake winding in a series circuit to the D. C. source to release the brake, and energize the stator winding; means interlocking operation of the contactors to insure restoring of the hoisting and lowering contactors before operation of the dynamic braking contactors and vice versa to exclude the resistor from the stator winding circuit; the D. C. energization of the stator winding effecting dynamic braking of the rotor on lowering; the said resistor having a value equal to that of the energized stator winding to cause the brake releasing current to be of the same value when released for power operation as when released for dynamic braking operation.

References Cited in the file of this patent
UNITED STATES PATENTS

| | | |
|---|---|---|
| 1,503,245 | Reed | July 29, 1924 |
| 2,525,541 | Grepe | Oct. 10, 1950 |

FOREIGN PATENTS

| | | |
|---|---|---|
| 531,907 | Great Britain | Jan. 14, 1941 |